US005858555A

United States Patent [19]

Kuroyama et al.

[11] Patent Number: 5,858,555

[45] Date of Patent: Jan. 12, 1999

[54] RECORDING PAPER AND METHOD OF PREPARING THE SAME

[75] Inventors: Yoshihiro Kuroyama; Teiichi Ohtani; Shoichi Endo, all of Shinjuku-ku, Japan

[73] Assignee: Nippon Paper Industries Co., Ltd., Tokyo, Japan

[21] Appl. No.: 551,744

[22] Filed: Nov. 7, 1995

[30] Foreign Application Priority Data

Nov. 8, 1994 [JP] Japan .................................... 6-298977

[51] Int. Cl.[6] ...................................................... B32B 29/00

[52] U.S. Cl. ................... 428/537.7; 428/207; 428/304.4; 428/308.8; 428/314.8; 428/537.5

[58] Field of Search ................................ 428/207, 537.7, 428/537.5, 304.4, 308.8, 314.8

[56] References Cited

U.S. PATENT DOCUMENTS

| | | | |
|---|---|---|---|
| 4,198,471 | 4/1980 | Nelson | 428/513 |
| 4,746,646 | 5/1988 | Nakanishi et al. | 503/227 |
| 4,778,711 | 10/1988 | Hosomura et al. | 428/211 |
| 5,008,231 | 4/1991 | Yoshizawa et al. | 503/207 |
| 5,281,467 | 1/1994 | Shimada et al. | 428/195 |
| 5,320,898 | 6/1994 | Yoshida et al. | 428/195 |
| 5,397,619 | 3/1995 | Kuroyama et al. | 428/141 |
| 5,411,798 | 5/1995 | Funae et al. | 428/341 |
| 5,468,564 | 11/1995 | Ohtani et al. | 428/537.5 |

*Primary Examiner*—Fred Zitomer
*Attorney, Agent, or Firm*—Millen, White, Zelano, & Branigan, P.C.

[57] ABSTRACT

Provided are a recording paper comprising a support paper coated on one side with a recording layer and a method of preparing the same: with the recording layer comprising 60–95 weight % of a pigment and 40–5 weight % of a water base binder and having a thickness of from 3 to 30 $\mu$m; wherein the surface roughness by ten point height on the recording layer surface is from 1 $\mu$m to 4 $\mu$m, the specular glossiness the recording layer surface at 75 degrees according to JIS P8142 is from 70% to 100%, and the part extending to the depth of at least 3 $\mu$m below the top surface has a hole distribution curve having at least peak showing an average pore diameter within the range of 0.1 to 1.0 $\mu$m and a height ranging from 0.1 to 1.0 ml/g with respect to pore volume when measured with a porosimeter of mercury intrusion type.

19 Claims, No Drawings

RECORDING PAPER AND METHOD OF PREPARING THE SAME

FIELD OF THE INVENTION

The present invention relates to a recording paper and, more particularly, to a recording paper which not only serves as an ink jet recording paper but also reproduces full-color images of high quality when used as a transfer paper for xerography.

BACKGROUND OF THE INVENTION

Hitherto, wood free paper and the like represented in non-coated papers have been prevailingly used as transfer papers for xerography This is because images of higher quality cannot be obtained when general coated papers for graphic arts, including art paper and coat paper, are used in xerography. In other words, although the formation of an ideal toner image on a coated paper can be expected theoretically since the coated paper can uniformly contact with a photoreceptor because of its very high surface smoothness, the recording quality practically provided by the coated paper is almost equal to that provided by non-coated papers.

One of reasons therefor is that a coated paper causes the so-called blister phenomenon, or a phenomenon such that the base paper thereof swells at the surface part contacting with the coated layer, to lower the image quality. This blister phenomenon originates in that a general coated paper for graphic arts has insufficient gas permeability because the coated layer thereof comprises various adhesives in considerably large amounts in order to secure high surface gloss after printing and high surface strength upon printing. The insufficient gas permeability of the coated paper makes it difficult to let out the vaporized moisture in the base paper upon fixation with a heating roll during the copying operation, and so the vaporized moisture causes the swelling of the base paper at the surface part contacting with the coated layer.

As preventive measures taken against the blister phenomenon, for instance, Tokko Hei 5-82940 (the term "Tokko" as used herein means an "examined Japanese patent publication") proposes the method of controlling the air permeability of a coated paper, the so-called porosity, to no more than 4,000 seconds, and Tokkai Hei 1-245265 (the term "Tokkai" as used herein means an "unexamined published Japanese patent application") proposes the adjustment of the gas permeability of a raw paper and the water vapor permeability of a coated layer to their individually specified ranges;

Another reason why coated papers cannot provide images of high quality when they are used as transfer papers for xerography is that images formed on coated papers have uneven gloss. In general, after-copy gloss of a paper having low glossiness tends to increase with an increase in quantity of the toner transferred, because thorough fusion of color toner is necessary to satisfactory color development. In a case where the glossiness of a paper itself is heightened as described in Tokko Hei 5-82940, on the other hand, glossiness of halftone and highlight areas having a relatively small quantity of toner becomes all the lower for the uneven adhesion of toner although high glossiness can be obtained in the background area and the solid area having a very large quantity of toner. As a result of it, the gloss balance of an image as a whole becomes unsatisfactory.

Even if only the surface of a coated layer is improved, therefore, uniform and high image gloss akin to that obtained by a photographic printing paper cannot be ensured in a full-color image independently of the quantity of toner transferred.

As for the ink jet recording paper, on the other hand, Tokko Sho 63-22997 discloses the invention in which attention is directed to the void structure of a coated layer. In order to achieve the gloss akin to that of a photographic printing paper according to that inventions however, it is necessary to perform a surface treatment using a supercalender, a gloss calender or the likes Further, the achievement of high glossiness requires an excessive surface treatment, and thereby voids are destroyed to make it impossible to retain the original void structure.

Thus, there has yet been known any recording paper which can match a photographic printing paper in image quality when it is used as not only a transfer paper for xerography but also an ink jet recording paper to be applied to a recording system different from xerography.

In order to develop transfer papers for xerography which can provide full-color images of high quality, the Inventors have made intensive studies, and found that when not only the surface of a coated layer has a special void structure, e.g., by adjustment of the pigment/binder ratio in the coated layer to a specified range but also the surface roughness and glossiness of the coated layer are properly controlled, the paper provided with such a coated layer can be a highly satisfactory full-color transfer paper for xerography, and what is more, suitable for an ink jet recording paper, thereby achieving the present invention.

SUMMARY OF THE INVENTION

It is therefore a first object of the present invention to provide a full-color transfer paper for xerography which neither causes the blister phenomenon nor has uneven gloss, and can form thereon an image whose glossiness is high and uniform throughout the whole thereof, independently of the quantity of toner transferred.

A second object of the present invention is to provide a recording paper which is suitable for not only a transfer paper for xerography but also an ink jet recording paper.

The above-described objects of the present invention are attained by a recording paper comprising a support paper coated on one side with a recording layer and a method of preparing the same: with the recording layer comprising 60–95 weight % of a pigment and 40–5 weight % of a water base binder and having a thickness of from 3 to 30 $\mu$m; wherein the surface roughness by ten point height on the recording layer surface is within the range of 1 to 4 $\mu$m, the specular glossiness of the recording layer surface at 75 degrees according to JIS P8142 is within the range of 70 to 100%, and the part extending to the depth of at least 3 $\mu$m below the top surface has a hole distribution curve having at least one peak showing an average pore diameter within the range of 0.1 to 1.0 $\mu$m and a height ranging from 0.1 to 1.0 ml/g with respect to pore volume when measured with a porosimeter of mercury intrusion type.

In accordance with the present invention, a recording paper comprises a coated layer having a special void structure in which holes of a specified size are present in a specified quantity, and so it can provide a high-grade feeling of recorded matter similar to that obtained by a photographic printing paper, that is, a recorded matter having not only high and uniform surface gloss but also uniform and high image gloss as a whole independently of the quantity of toner, and further high image reproducibility, excellent tone characteristics and so on.

DETAILED DESCRIPTION OF THE INVENTION

The foregoing average pore diameter and pore volume are factors representing the void structure of a recording layer surface, and they are determined in the present invention by the following procedure: A recording paper itself and the recording paper from which the surface part has been pared away in a layer at least 3 μm thick with a razor or the like are each examined for hole distribution by means of a porosimeter of mercury intrusion type. Differences between the thus obtained two hole distribution curves are investigated, thereby specifying the void structure of the surface layer pared off.

A reason why the thickness of the surface layer to be examined for hole distribution is defined as at least 3 μm is that the absorption of fused toner is influenced by the surface condition of a recording paper extending to the depth of 3 μm or so below the top surface.

When the average pore diameter is smaller than 0.1 μm, the absorption speed of fused toner becomes slow even when the pore volume is large. As a result of it, the halftone area becomes rough due to the toner adhesion thereto, and thereby uneven gloss is caused. On the other hand, the average pore diameter larger than 1.0 μm is undesirable because the surface of a coated layer itself becomes rough to lower the surface gloss of the resulting paper.

When the pore volume is smaller than 0.1 ml/g, the transfer paper has a too compact surface. Accordingly, its capacity for accommodating toner is lowered, and so the roughness is caused by the toner adhesion to result in the generation of uneven gloss On the other hand, the pore volume greater than 1.0 ml/g permits the permeation of fused toner into the inner part of the transfer paper to result in lowering of image density. Additionally, the aforementioned relations that the average pore diameter and the pore volume bear to the toner behavior correspond to relations that they bear to ink behavior in ink jet recording, provided that the generation of roughness due to the toner adhesion is replaced with the running-over phenomenon of ink due to the retardation of ink absorption.

In order to form a recording layer having the aforementioned void structure, it is desirable that the pigment in a coating composition to constitute the surface part of a recording layer be chosen from those capable of forming as many voids as possible after coating.

Besides the above-described point, there is no other particular restriction as to the pigment to be used. However, pigments having a needlelike or columnar crystal form, great oil absorption and small bulk density are used to advantage. Of pigments having such properties, precipitated calcium carbonate having a needlelike or columnar crystal form is preferred over the others. As for the pigment used in the present invention, it is desirable that 30–100 weight % of the pigment be precipitated calcium carbonate having a needlelike crystal form, that having a columnar crystal form, or a mixture thereof.

Even if a pigment capable of increasing voids in quantity is used, the excessive use of a binder as the adhesive to be mixed therewith results in filling of voids with the binder. In such a case, the quantity of voids in a recording layer is reduced, and so the intended image quality cannot be obtained. Therefore, it is required to control the amount of a binder used depending on the species of the pigment used. In addition, as a binder varies in its manner of migration depending on the coating method adopted and the type of a support paper used, the binder remaining in the surface part of a recording layer is different in quantity even if the same amount of binder is admixed with a pigment.

When precipitated calcium carbonate having a needlelike or columnar crystal form is used as a pigment, it is desirable that the binder content in a coated layer range from 5 to 40 weight % and the pigment content therein range from 95 to 60 weight %. The binder content lower than 5 weight % is undesirable, because the coated layer obtained is short of strength, and so it is liable to come off; whereas the binder content higher than 40 weight % makes the coated layer surface too compact, and so the voids necessary to absorb fused toner are reduced in quantity to cause uneven gloss.

The present invention has no particular restriction as to the species of a binder, provided that the binder can ensure sufficient adhesion power between a pigment and a support paper and does not give rise to a blocking phenomenon between recording papers However, it is desirable to use a water base binder. The term "water base binder" as used herein is intended to include water-soluble polymer compounds and polymer compounds capable of forming aqueous emulsions. Specific examples of such a binder include natural polymer compounds such as various kinds of starch, e.g., oxidized starch, esterified starch, enzyme-denatured starch, cationized starch, etc.; proteins, e.g., casein, soybean protein, etc.; and cellulose derivatives, e.g., carboxymethyl cellulose, hydroxyethyl cellulose, etc. water-soluble polymers such as polyvinyl alcohol, etc. and various synthetic resins such as styrene-acrylic resins, styrene-butadiene resins, vinyl acetate resins, acrylic resins, polyurethane resins and the like.

These binders may be used alone or as a mixture of two or more thereof. From the standpoint of satisfying both of the requirements for surface gloss and voids in the surface layer, as described hereinafter also, it is desirable to adopt a cast coating method involving a coagulation process, in providing a recording layer. When such a cast coating method is adopted, it is preferable for the binder to be proteins suitable for the coagulation process, especially casein. When the binder used in the present invention comprises casein, the proportion of casein to the whole binder is preferably in the range of 30 to 100 weight %.

In addition to the above-described pigment and binder, the coated layer of the present invention may optionally contain various additives, including dyes for controlling hue, an agent for dispersing a pigment, an antiseptic, an antifoaming agent, a surface lubricant, a pH modifier and so on.

Any coating method may be adopted in the present invention, provided that they are applicable to the preparation of general pigment-coated papers; More specifically, the recording layer of the invention is formed using a method properly chosen from known coating methods using, e.g., a blade coater, an air knife coater, a roll coater, a curtain coater, a bar coater, a gravure coater, a comma coater and so on. The coverage rate on one side of a support paper ranges from 5 to 25 $g/m^2$, preferably from 10 to 23 $g/m^2$, on a dry weight basis, and it is desirable that the dry thickness of the coated layer be from 3 to 30 μm.

From the viewpoint of ensuring high surface gloss and controlling the voids in the surface layer to the range defined by the present invention, it is favorable for the drying of a coated layer to adopt a drying method used for general cast coated papers for graphic arts, wherein the coated layer surface is directly pressed to a heated mirror-finished face as it is in a wet condition. In particular, it is preferable in the present invention to adopt the cast coating method involving a coagulation process.

As for the coagulating agent used in the coagulation method, various metal salts, such as the potassium, calcium, zinc, barium, lead, magnesium, cadmium or aluminum salts of formic acid, acetic acid, citric acid, tartaric acid, lactic acid, hydrochloric acid, sulfuric acid, etc., namely potassium sulfate, potassium citrate, borax and so on, are typical examples thereof. In the present invention, however, it is desirable to use the salts of formic acid.

The term "heated mirror-finished face" as used in the present invention refers to a cylindrical drum heated generally to 100° C. and having a mirror-finished face. The use of such a drum makes it easy to confer 70–100% of specular glossiness at 75 degrees on the surface of a coated paper. Further, the surface roughness by ten point height on the recording layer surface can be easily adjusted to 1–4 $\mu$m by the use of the above-described drum, too.

A support paper on which the recording layer is coated can be properly chosen from conventional raw papers For instance, acidic paper, neutralized paper and recycled paper can be used.

The present recording paper can be applied to not only a transfer paper for xerography but also an ink jet recording paper of high quality akin to that of a photographic printing paper. This is because the present invention enables the presence of voids specific in size at the surface of a recording paper while ensuring high surface gloss to the recording paper and thereby sufficient ink absorbency is also ensured in the recording paper. Thus, prints of high quality can be obtained in ink jet recording also.

Now, the present invention will be illustrated in greater detail by reference to the following examples and comparative examples. However, the invention should not be construed as being limited to these examples. Prior to the description of such examples, the methods of tests and measurements performed therein and the criteria adopted for evaluation of testing results are mentioned below. Additionally, all "parts" and "%" in the examples and comparative examples are by weight.

(1) Surface roughness by ten point height:

It is measured using the method according to JIS B0601.

(2) Paper Surface Gloss before Recording:

It is measured using the method according to JIS P8142.

(3) Image Gloss:

Images of violet color having their respective dot percents within the range of 20 to 100% are recorded on a recording paper with a copying machine Model Artage 5330, product of Ricoh Co., Ltd., and the image gloss in the highlight areas (dot percent: 30%), that in halftone areas (dot percent: 50%) and that in solid areas (dot percent: 100%) are measured using the method according to JIS P8142.

(4) Blister:

A solid image of violet color (measuring 5 cm×5 cm in size) is copied with a xerographic copying machine Artage 5330, product of Ricoh Co., Ltd., on a recording paper which has undergone the pretreatment according to the method defined by JIS P8111 under the temperature of 20±2° C. and the relative humidity of 65±5%. Then, the extent of blister generated on the copied face is evaluated by visual observation according to the following criterion;

○: No blister spot is observed at all.

Δ: One to three blister spots are observed.

X: Not less than 4 blister spots are observed, (5) Image Reproduction:

The image samples used for the measurement of image gloss are examined for difference in color from the original and for uneven color by visual observation. The extent of the difference and unevenness in color is evaluated according to the following criterion:

○: The difference in color and uneven color are hardly observed

Δ: The difference in color and uneven color are slightly observed.

X: The difference in color and uneven color are considerably observed.

(6) Uniformity of Gloss:

The image samples used for the measurement of image gloss are examined for gloss balance, and evaluated using the following criterion:

○: Gloss is uniform and high as a whole.

Δ: Gloss is on a low level as a whole.

X: Image gloss is partly lower than that of the background areas (7) Suitability for Ink Jet Recording:

The printing is carried out on a recording paper with a color ink jet printer, Model 1200 C, product of Hewlett-Packard Co..

(a) The print obtained is evaluated by visual observation according to the following criterion;

○: No running-over of ink is observed at all.

Δ: Running-over of ink is observed to a small extent,

X: Running-over of ink is observed to a considerable extent (b) Each of individual color images (cyan, magenta, yellow and black images) in solid areas is examined for recorded density by means of a Macbeth densitometer RD-514, (8) Hole Distribution Curve:

A recording paper itself and the recording paper from which the surface part pared away in a layer at least 3 $\mu$m thick are each examined for hole distribution curve by a mercury intrusion method. A comparison of the thus obtained hole distribution curves are made, and thereby is specified the void structure of the surface layer about 3 $\mu$m thick.

EXAMPLE 1

A raw paper used as a support paper was made from 100 parts of hardwood Kraft pulp having freeness of 420 ml admixed with 20 parts of ground calcium carbonate, 0.2 part of alkyl ketene dimer and 0.5 part of aluminum sulfate, and subjected to a calendering treatment. The raw paper thus made had a smoothness of 40 seconds and a basis weight of 88 g/m$^2$.

The raw paper obtained was coated by means of a roll coater with a coating composition prepared using as a pigment the blend of 50 parts (35.5%) of precipitated calcium carbonate (Unibur-70, trade name, a product of Shiraishi Calcium Kaisha Ltd.) with 50 parts (35.5%) of ground calcium carbonate (Escalon 2000, trade name, a product of Sankyo Seifun K.K.) and mixing the pigment with a binder constituted of 18 parts (12.8%) of casein (Lactic Casein, trade name, a product of New Zealand) and 22 parts (15.6%) of a styrene-butadiene latex (JSR 0617, trade name, a product of Japan Synthetic Rubber Co., Ltd.), 0.3 part (0.2%) of sodium polyacrylate (Aron T-45, trade name, a product of Toagosei Chemical Industry Co., Ltd.) as a dispersant, 0.5 part (0.4%) of calcium stearate (Nopcoat C-104, trade name, a product of San Nopco K.K.) as a surface lubricant, and a pH adjusting agent, The coating thus formed on the raw paper was subjected to a coagulation treatment by applying thereto a 10 weight % water solution of calcium formate.

Then, the coating was brought into pressure contact with the mirror surface of a cast drum heated to 95° C. while it was wet, and thereby the drying thereof was effected to prepare a recording paper according to the present invention. This recording paper had a coating weight of 17 g/m$^2$ on a dry weight basis. The test results of this recording paper, including the surface roughness by ten point height, the peak position in the hole distribution curve (which corresponds to the average pore diameter) and the pore volume, are showy in Table 1. Further, the recording characteristics which the recording paper exhibited when used as a transfer paper for xerography and an ink jet recording paper respectively are shown in Table 2.

EXAMPLE 2

The same raw paper as made in Example 1 was coated with a coating composition prepared in the same manner as in Example 1, except that the pigment used was changed to 100 parts (66.3%) of precipitated calcium carbonate (Unibur-70, trade name, a product of Shiraishi Calcium Kaisha Ltd.) and the amounts of the casein and the latex admixed with the pigment were changed to 20 parts (13.3%) and 30 parts (19.9%) respectively, and then underwent the same treatments as in Example 1 to provide a recording paper according to the present invention. This recording paper had a coating weight of 19 g/m$^2$ on a dry weight basis The test results of the recording paper thus obtained, including the surface roughness by ten point height, the peak position in the hole distribution curve and the pore volume, are shown in Table 1 Further, the recording characteristics which the recording paper exhibited when used as a transfer paper for xerography and an ink jet recording paper respectively are shown in Table 2.

EXAMPLE 3

A recording paper according to the present invention was prepared in the same manner as in Example 1, except that the proportions of the precipitated and ground calcium carbonates in the coating composition were each changed to 45.1%, the amounts of the casein and the latex admixed with the pigment were changed to 3 parts (2.7%) and 7 parts (6.3%) respectively and the coating weight was changed to 14 g/m$^2$ on a dry weight basis, The test results of the recording paper obtained, including the surface roughness by ten point height, the peak position in the hole distribution curve and the pore volume, are shown in Table 1. Further, the recording characteristics which the recording paper exhibited when used as a transfer paper for xerography and an ink jet recording paper respectively are shown in Table 2.

EXAMPLE 4

A recording paper according to the present invention was prepared in the same manner as in Example 1, except that the pigment used in the coating composition was changed to the blend of 40 parts (24.9%) of precipitated calcium carbonate (Unibur-70, trade name, a product of Shiraishi Calcium Kaisha Ltd.) with 60 parts (37.3%) of synthetic silica (Mizukasil P-78A, trade name, a product of Mizusawa Industrial Chemical Ltd), the amounts of casein and the latex admixed with the pigment were each changed to 30 parts (18.7%) and the coating weight was changed to 22 g/m$^2$ on a dry weight basis. The test results of the recording paper obtained, including the surface roughness by ten point height, the peak position in the hole distribution curve and the pore volume, are shown in Table 1. Further, the recording characteristics which the recording paper exhibited when used as a transfer paper for xerography and an ink jet recording paper respectively are shown in Table 2.

EXAMPLE 5

A recording paper according to the present invention was prepared in the same manner as in Example 1, except that the pigment used in the coating composition was changed to the blend of 60 parts (51.8%) of precipitated calcium carbonate (Unibur-70, trade name, a product of Shiraishi Calcium Kaisha Ltd.) with 40 parts (34.5%) of first-class kaolin (Ultrawhite 90, trade name, a product of EMC Co., Ltd.), the amounts of the casein and the latex admixed with the pigment were changed to 5 parts (4.3%) and 10 parts (8.6%) respectively and the coating weight was changed to 18 g/m$^2$ on a dry weight basis. The test results of the recording paper obtained, including the surface roughness by ten point height, the peak position in the hole distribution curve and the pore volume, are shown in Table 1, Further, the recording characteristics which the recording paper exhibited when used as a transfer paper for xerography and an ink jet recording paper respectively are shown in Table 2.

COMPARATIVE EXAMPLE 1

A coated paper was prepared in the same manner as in Example 1, except that the pigment used in the coating composition was changed to the blend of 60 parts (29.9%) of precipitated calcium carbonate (Unibur-70, trade name, a product of Shiraishi Calcium Kaisha Ltd.) with 40 parts (19.9%) of first-class kaolin (Ultrawhite 90, trade name, a product of EMC Co., Ltd.), the amounts of the casein and the latex admixed with the pigment were each changed to 50 parts (24.9%) and the coating weight was changed to 15 g/m$^2$ on a dry weight basis. The test results of the coated paper obtained, including the surface roughness by ten point height, the peak position in the hole distribution curve and the pore volume, are shown in Table 1. Further, the recording characteristics which the coated paper exhibited when used as a transfer paper for xerography and an ink jet recording paper respectively are shown in Table 2.

COMPARATIVE EXAMPLE 2

A coated paper was prepared in the same manner as in Example 1, except that the pigment used in the coating composition was changed to 100 parts (73.6%) of first-class kaolin (Ultrawhite 90, trade name, a product of EMC Co., Ltd.), the amounts of the casein and the latex admixed with the pigment were changed to 15 parts (11.0%) and 20 parts (14.7%) respectively, and the coating weight was changed to 15 g/m$^2$ on a dry weight basis. The test results of the coated paper obtained, including the surface roughness by ten point height, the peak position in the hole distribution curve and the pore volume, are shown in Table 1.

Further, the recording characteristics which the coated paper exhibited when used as a transfer paper for xerography and an ink jet recording paper respectively are shown in Table 2.

COMPARATIVE EXAMPLE 3

A coated paper was prepared in the same manner as in Example 1, except that the pigment used in the coating composition was changed to 100 parts (66.3%) of ground calcium carbonate (Super #1700, trade name, a product of Maruo Calcium Co., Ltd.), the amounts of the casein and the latex admixed with the pigment were changed to 20 parts (13.3%) and 30 parts (19.9%) respectively, and the coating weight was changed to 14 g/m$^2$ on a dry weight basis. The test results of the coated paper obtained, including the surface roughness by ten point height, the peak position in the hole distribution curve and the pore volume, are shown in Table 1. Further, the recording characteristics which the coated paper exhibited when used as a transfer paper for xerography and an ink jet recording paper respectively are shown in Table 2.

COMPARATIVE EXAMPLE 4

A coated paper was prepared in the same manner as in Example 1, except that the pigment used in the coating composition was changed to 100 parts (90.3%) of ground calcium carbonate (Super S, trade name, a product of Maruo Calcium Co., Ltd.), the amounts of the casein and the latex admixed with the pigment were each changed to 5 parts (4;5%)I and the coating weight was changed to 14 g/m$^2$ on a dry weight basis. The test results of the coated paper obtained, including the surface roughness by ten point height, the peak position in the hole distribution curve and the pore volume, are shown in Table 1. Further, the recording characteristics which the coated paper exhibited when used as a transfer paper for xerography and an ink jet recording paper respectively are shown in Table 2.

COMPARATIVE EXAMPLE 5

The same coating composition as used in Example 4 was applied to the same raw paper as used therein by means of a blade coater, dried with a hot-air dryer, and further subjected to a super calender treatment. Thus, a coated paper having the coating weight of 14 g/m$^2$ on a dry weight basis was obtained The test results of the coated paper thus obtained, including the surface roughness by ten point height, the peak position in the hole distribution curve and the pore volume, are shown in Table 1 Further, the recording characteristics which the coated paper exhibited when used as a transfer paper for xerography and an ink jet recording paper respectively are shown in Table 2.

Additionally, the abbreviation “calc. carb.” in Table 1 refers to calcium carbonate.

TABLE 1

| | Amount of Pigment mixed (%) | Amount of Binder mixed (%) | Pigment Composition (ratio: by weight) | Surface Roughness by 10 Point Height (μm) | Hole Distribution Curve: Peak Position (μm) | | Hole Distribution Curve: Pore Volume (ml/g) | |
|---|---|---|---|---|---|---|---|---|
| Example 1 | 71.0 | 28.4 | precipitated calc. carb./ ground calc. carb. = 50/50 | 1.4 | 0.4 | 0.05 | 0.3 | 0.2 |
| Example 2 | 66.3 | 33.2 | precipitated calc. carb. = 100 | 1.1 | 0.5 | 0.03 | 0.4 | 0.2 |
| Example 3 | 90.2 | 9.0 | precipitated calc. carb./ ground calc. carb. = 50/50 | 2.0 | 0.5 | 0.05 | 0.5 | 0.2 |
| Example 4 | 62.2 | 37.4 | precipitated calc. carb./ synthetic silica = 40/60 | 3.2 | 0.3 | 0.04 | 0.2 | 0.2 |
| Example 5 | 86.3 | 12.9 | precipitated calc. carb./ kaolin = 60/40 | 0.8 | 0.4 | 0.04 | 0.4 | 0.2 |
| Comparative Example 1 | 49.8 | 49.8 | precipitated calc. carb./ kaolin = 60/40 | 1.6 | 0.1 | 0.03 | 0.06 | 0.02 |
| Comparative Example 2 | 73.6 | 25.7 | kaolin = 100 | 0.7 | 0.08 | — | 0.15 | — |
| Comparative Example 3 | 66.3 | 33.2 | ground calc. carb. = 100 | 1.8 | 0.4 | — | 0.08 | — |
| Comparative Example 4 | 90.3 | 9.0 | ground calc. carb. = 100 | 2.2 | 1.2 | — | 0.6 | — |
| Comparative Example 5 | 62.2 | 37.4 | ground calc. carb. = 100 | 4.6 | 0.3 | 0.02 | 0.08 | 0.1 |

TABLE 2

Recording Characteristics in Xerography

| | Surface Gloss (%) before Recording | Gloss (%) in Image Areas Dot Percent (%) 30 | 50 | 100 | Uniformity of Gloss as a Whole | Blister | Image Reproduction | Recording Characteristics in Ink Jet Recording: Ink Absorption | Recorded Density in Solid Area: Cyan | Magenta | Yellow | Black |
|---|---|---|---|---|---|---|---|---|---|---|---|---|
| Example 1 | 88 | 88 | 90 | 92 | ○ | ○ | ○ | ○ | 1.36 | 1.14 | 0.89 | 1.78 |
| Example 2 | 86 | 86 | 90 | 92 | ○ | ○ | ○ | ○ | 1.35 | 1.13 | 0.93 | 1.78 |
| Example 3 | 85 | 86 | 89 | 92 | ○ | ○ | ○ | ○ | 1.35 | 1.14 | 0.91 | 1.77 |
| Example 4 | 85 | 86 | 88 | 92 | ○ | ○ | ○ | ○ | 1.43 | 1.15 | 0.94 | 1.84 |
| Example 5 | 86 | 87 | 90 | 93 | ○ | ○ | ○ | ○ | 1.36 | 1.14 | 0.92 | 1.77 |
| Comparative Example 1 | 86 | 51 | 38 | 82 | x | x | x | x | 1.39 | 1.13 | 0.99 | 1.79 |
| Comparative Example 2 | 74 | 54 | 40 | 76 | x | ○ | x | x | 1.37 | 1.07 | 0.95 | 1.71 |
| Comparative Example 3 | 76 | 58 | 50 | 78 | x | Δ | Δ | x | 1.38 | 1.10 | 0.96 | 1.73 |
| Comparative Example 4 | 50 | 54 | 58 | 76 | Δ | Δ | ○ | Δ | 1.35 | 1.05 | 0.92 | 1.70 |
| Comparative Example 5 | 40 | 44 | 56 | 68 | Δ | x | ○ | ○ | 1.41 | 1.15 | 0.93 | 1.83 |

What is claimed is:

1. A recording paper comprising a support paper coated on one side with a recording layer:

said recording layer comprising 60–95 weight % of a pigment, and 30–100 weight % of said pigment being needlelike precipitated calcium carbonate, columnar precipitated calcium carbonate or a mixture thereof, and 40–5% weight % of a water base binder and having a thickness of from 3 to 30 μm;

wherein the surface roughness by ten point height on the recording layer surface is from 1 to 4 μm, the specular glossiness of the recording layer surface at 75 degrees according to JIS P8142 is from 70 to 100%, and the part extending to the depth of at least 3 μm below the top surface has a hole distribution curve having at least one peak showing an average pore diameter in the range of 0.1 to 1.0 μm and a height ranging from 0.1 to 1.0 ml/g with respect to pore volume when measured with a porosimeter of mercury intrusion type.

2. A recording paper of claim 1, wherein 30–100 weight % of said water base binder is casein.

3. A recording paper of claim 1, wherein 30–100 weight % of said water base binder is casein.

4. A recording paper of claim 1, wherein the residual % of said pigment is ground calcium carbonate, synthetic silica or kaolin.

5. A recording paper of claim 2, wherein the residual weight % of the binder is oxidized starch, esterified starch, enzyme-denatured starch, cationized starch, soybean protein, carboxymethyl cellulose, hydroxyethyl cellulose, polyvinyl alcohol, a styrene-butadiene latex, a vinyl acetate emulsion, an acrylic emulsion or a mixture of two or more thereof.

6. A method of preparing a recording paper comprising:

a step of preparing a coating composition for forming a recording layer, which comprises at least 60–95 weight % of a pigment, 30–100 weight % of the pigment being needlelike precipitated calcium carbonate, columnar precipitated calcium carbonate or a mixture thereof, and 40–5 weight % of a water base binder;

a step of coating a support paper surface with said coating composition so that the recording layer has a coverage rate of 5–25 g/m$^2$ on a dry weight basis;

a step of coagulating said water base binder by the use of a coagulating agent while the surface of the coated layer is in a wet condition; and a step of drying the coating layer having a wet surface by pressing the surface directly to a heated mirror-finished face such that a recording paper with a dried recording layer is produced wherein the part of the dried recording layer extending to a depth of at least 3 μm below the top of the layer has a hole distribution curve having at least one peak showing an average pore diameter in the range of 0.1 to 1.0 μm and a height ranging from 0.1 to 1.0 ml/g with respect to the pore volume when measured with a porosimeter of mercury intrusion type.

7. A method of preparing a recording paper as described in claim 6, wherein the coagulating agent is a salt of formic acid.

8. A method of preparing a recording paper as described in claim 6, wherein the coverage rate of the recording layer is 10–23 g/m$^2$ on a dry weight basis.

9. The recording paper of claim 2, wherein the residual weight % of the binder is a starch, a protein, a cellulose derivative, a water soluble polymer, a synthetic resin or a mixture thereof.

10. The recording paper of claim 2, wherein the residual weight % of the binder is oxidized starch, esterified starch, enzyme-denatured starch, cationized starch, soybean protein, carboxymethyl cellulose, hydroxyethyl cellulose, polyvinyl alcohol, a styrene-acrylic resin, a styrene-butadiene resin, a vinyl acetate resin, a polyurethane resin or a mixture thereof.

11. The recording paper of claim 3, wherein the residual weight % of the binder is a starch, a protein, a cellulose derivative, a water soluble polymer, a synthetic resin or a mixture thereof.

12. The recording paper of claim 3, wherein the residual weight% of the binder is oxidized starch, esterified starch, enzyme-denatured starch, cationized starch, soybean protein, carboxymethyl cellulose, hydroxyethyl cellulose, polyvinyl alcohol, a styrene-acrylic resin, a styrene-butadiene resin, a vinyl acetate resin, a polyurethane resin or a mixture thereof.

13. The method of claim 6, wherein the thickness of the coated layer after drying is from 3 to 30 μm.

14. The method of claim 6, wherein the heated mirror-finished face is at a temperature of generally 100° C.

15. A recording paper made according to the method of claim 6.

16. The recording paper of claim 1, wherein 30–100% by weight of the pigment is needlelike precipitated calcium carbonate.

17. The method of claim 6, wherein 30–100% by weight of the pigment is needlelike precipitated calcium carbonate.

18. The recording paper of claim 1, wherein the residual % of pigment is synthetic silica.

19. The method of claim 6, wherein the residual % of pigment is synthetic silica.

* * * * *